INVENTOR.
RANDALL C. RAGAN
BY
ATTORNEY.

July 16, 1963  R. C. RAGAN  3,097,929
METHOD FOR CONTINUOUS MANUFACTURE OF CERAMIC SHEATHING
Filed April 16, 1956  3 Sheets-Sheet 2
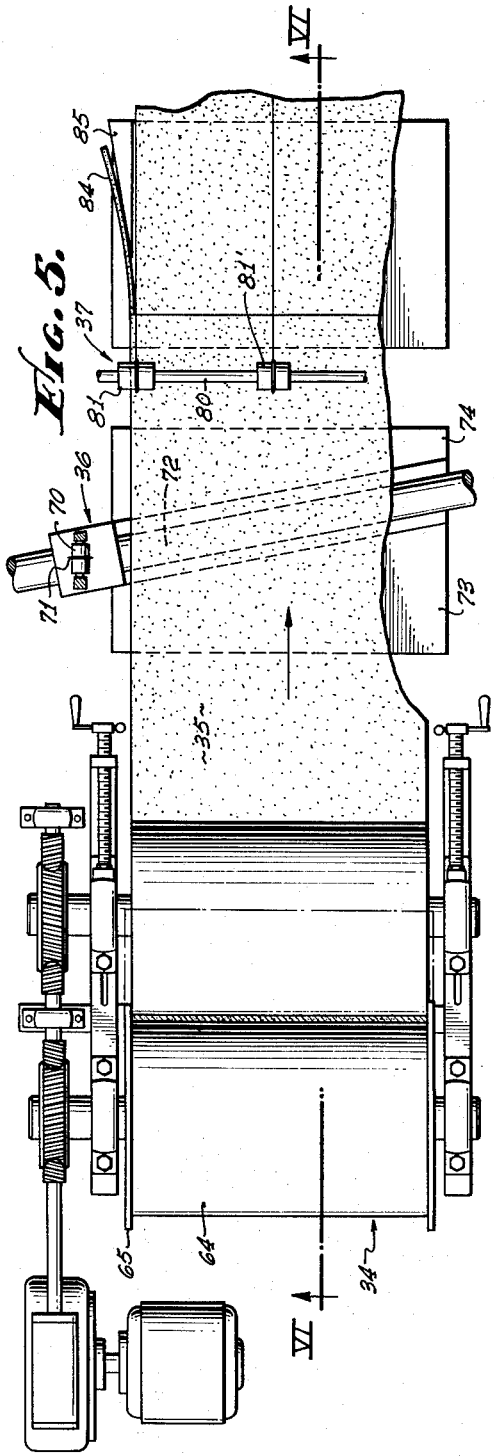
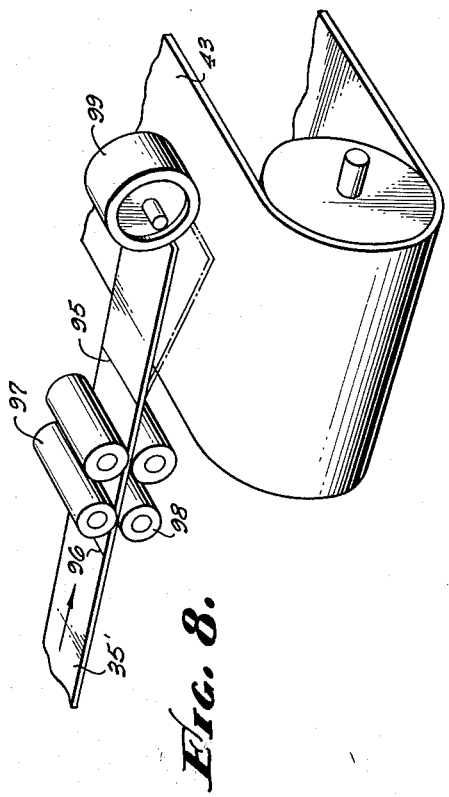
INVENTOR.
RANDALL C. RAGAN
BY
ATTORNEY.

July 16, 1963 R. C. RAGAN 3,097,929
METHOD FOR CONTINUOUS MANUFACTURE OF CERAMIC SHEATHING
Filed April 16, 1956 3 Sheets-Sheet 3
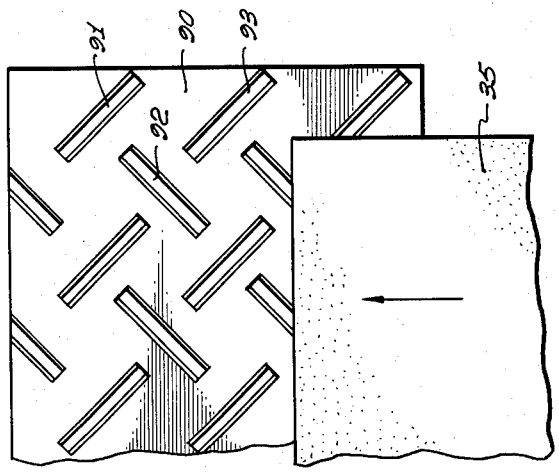
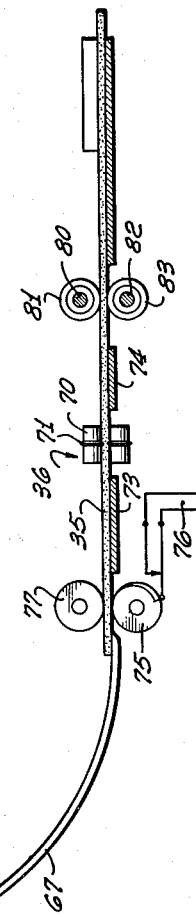
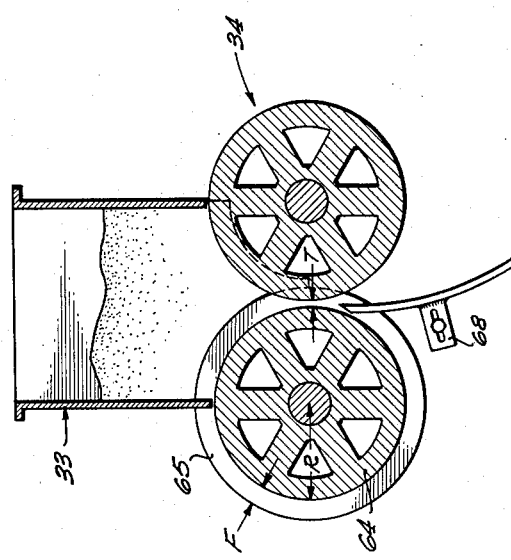
INVENTOR.
RANDALL C. RAGAN
BY
ATTORNEY.

United States Patent Office 3,097,929
Patented July 16, 1963

3,097,929
METHOD FOR CONTINUOUS MANUFACTURE OF CERAMIC SHEATHING
Randall C. Ragan, Tarzana, Calif., assignor to Gladding, McBean & Co., Los Angeles, Calif., a corporation of California
Filed Apr. 16, 1956, Ser. No. 578,485
6 Claims. (Cl. 25—156)

This invention pertains to novel methods for the continuous manufacture of very thin ceramic objects, such as light and thin plates of dielectric insulating material adapted for use in electrical and electronic equipment, light, thin tile and ceramic facings and coverings, ceramic veneer, sheathing, panelling, heat-resistant carriers for catalysts, etc., certain of said products being of appreciable thickness and provided with extensive planar surfaces. The invention also contemplates methods of continuously manufacturing flexible, leather-like, dense, continuous strips of ceramic compositions from which various products can be readily manufactured. The invention also relates to methods whereby density and homogeneity of the products may be controlled, whereby the finished products may be provided with glazed or otherwise decorated surfaces, and to the use of compositions, materials and devices whereby the various products hereinbefore referred to may be manufactured economically and efficiently.

Ceramic tile are ordinarily made by dry-pressing a body composition in a press which compresses a substantially dry mixture of finely divided body composition to the ultimate size and shape of the tile. Definite limitations as to minimum thickness of tile so pressed have been found to exist and it is virtually impossible to compress and process normal bodies of finished tile with a shape and size where the width or face dimension of the tile is more than twenty times the thickness of the tile. Ordinary methods of compression such as are used in tile presses (including single-acting and double-acting types of presses) cannot be employed in the preparation of extremely thin wafers of ceramic material for use as separators, insulators, etc. As a result, floor and decorative wall tile made heretofore were relatively thick and heavy, could not be shipped great distances because of the excessive costs of transportation, had to be installed individually, and required large expenditures of time and money in order to be properly installed.

The present invention is based upon the discovery of methods, and conditions whereby ceramic articles having planar surfaces, such as tile, thin insulating wafers, etc. may be made in a continuous manner, such tile having a face dimension or width from 30 to 1000 times the thickness thereof. Differently expressed, ceramic objects in the form of sheets or plates and having a thickness of from about 0.001 to 0.150 inch may be made, the objects having any desired width from, say 1 inch to 6 inches or more. Moreover, the present invention is directed to the production of thin, wafer-like tile provided with glazed or otherwise decorated surfaces and to methods whereby such tile or ceramic veneer may be supplied to the architect and builder in the form of large sheets capable of being readily applied to the external and internal surfaces of buildings and other structures, each sheet bearing a plurality of tile units, thereby obviating the necessity of installing the tile in the form of separate and discrete, small elements or units.

In addition, the present invention contemplates the production of large panels or sheets of ceramic material provided with planar surfaces, such panels or sheets having any desired thickness of say from 0.1 to 0.6 inch, and a width or length of from two to four and even six feet.

This application is a continuation-in-part of Serial No. 329,265, filed January 2, 1953, now Patent No. 3,007,222.

An object of the present invention, therefore, is to disclose and provide methods and conditions whereby very thin ceramic objects may be rapidly and economically manufactured in a continuous manner.

A still further object of the invention is to disclose and provide novel, continuous methods of making ceramic objects having planar surfaces.

Again, an object of the invention is to disclose and provide a method whereby free-flowing, comminuted ceramic compositions may be converted directly into long, continuous, coherent, leathery strips having smooth planar surfaces and capable of being die-punched or otherwise divided into units.

A further object of the invention is to disclose and provide methods and conditions of converting comminuted ceramic compositions into dense, homogeneous and continuous strips capable of being used in the manufacture of tile and panels of various sizes.

Moreover, it is an object of the present invention to disclose and provide conditions whereby finely divided or comminuted ceramic compositions may be converted into dense, coherent, continuous and flexible ribbon-like strips having smooth, calendered surfaces, such formed strips having a remarkably low drying and firing shrinkage and very high green strength.

These and various other advantages, adaptations, characteristics and uses of the invention will become apparent from the following description in which exemplary modes of procedure and products made thereby will be described. For purposes of example and illustrations, reference will be had to the appended drawings, in which:

FIG. 5 is an enlarged plan view of a modified form of forming roll arrangement adapted for use in the practice of the invention, together with scoring units.

FIG. 6 is a vertical section along plane VI—VI through FIG. 5.

FIG. 7 is a fragmentary plan view of a supporting means for a ribbon of material passing through a kiln.

FIG. 8 diagrammatically illustrates one form of automatic breaker that may be employed.

Generally stated, the method of the present invention comprises forming a thin coherent, continuous strip of compressed ceramic composition, the width of said strip being generally more than thirty times the thickness thereof. This strip, in its unburned condition, is somewhat pliable and leathery and is provided with a smooth, dense surface which retains its calendered, smooth character even after firing. In the event the finished product is not to be glazed, the leathery strip may be divided into units of a desired size and shape and then subjected to firing at a temperature sufficient to mature the ceramic composition. If, however, the final product is to be provided with a glazed or decorated surface, then a layer of glaze-forming composition may be applied to a surface of such strip before it is subjected to firing, although glaze can also be applied to a surface of the previously burned strip or to individual units formed from such strip. The latter procedure involves both a bisque and a glost firing and is well adapted to large scale production.

It will be noted that in contradistinction to previous methods of procedure, wherein individual tile units were separately made by dry-pressing or the like, the present method is concerned with the continuous production of a long or continuous strip or ribbon of a desired finished thickness, which ribbon is then subdivided into tile units in a continuous or semi-continuous manner. The method of the present invention is therefore, eminently suited for use with continuous kilns and greatly shortens the time required to produce a given number of tile and reduces labor costs to a minimum. It may also be noted at this time that the method of the present invention insures the production of finished tile more closely adherent to established, predetermined size limitations and does not produce the relatively large proportion of warped or off-size tile.

Figure 1:
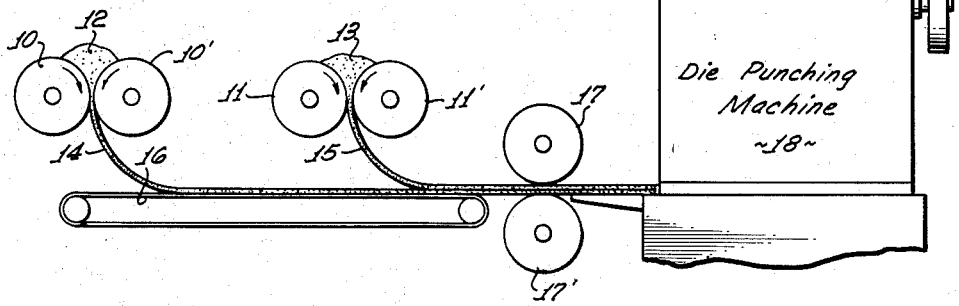
FIG. 1 is a diagrammatic representation in side elevation of an arrangement of elements adapted for use in the manufacture of continuous ribbons of ceramic material and its conversion into tile, facings, panels or the like pursuant to this invention.
Figure 2:
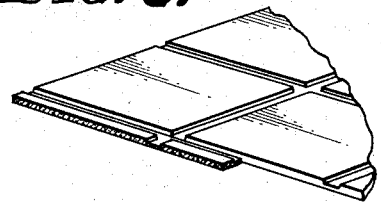
FIG. 2 is a perspective view of a portion of a continuous strip of unburned ceramic composition showing one method of dividing such strip into units.

By referring to the diagrammatic representation in FIG. 1, the basic elements of the method contemplated by this invention will become apparent. The apparatus there illustrated may be used in the production of thin, glazed tile, sheathing or veneer. The apparatus may consist of a pair of self-feeding, ribbon-forming rolls 10 and 10' provided with hard, smooth, cylindrical surfaces, these two rolls being driven in opposite directions as indicated by arrows towards a gap between the rolls. A suitable body composition 12 in free-flowing, granular or comminuted form is deposited upon the converging surfaces of the opposing rolls. The rolls 10 and 10' are driven at the same peripheral speed on parallel horizontally disposed axes and subject the ceramic composition 12 to extremely high pressure, compacting such composition into a dense, coherent, leather-like, somewhat flexible, ribbon-like strip 14 which may be discharged upon a continuous conveyor 16 or other suitable planar surface. It will be found that the continuous, ribbon-like strip 14 is provided with smooth, calendered surfaces.

A similar pair of rolls 11 and 11' driven in the same manner may be positioned near the first set, this second pair of rolls being supplied with a comminuted relatively dry glaze composition 13 which is also subjected to extreme pressure by the rolls and discharged therefrom in the form of a thin, continuous, leather-like strip 15.

The two strips or ribbons 14 and 15 may be slightly compressed by passage between rollers 17—17' and the resulting laminated ribbon then subjected to suitable scoring, trimming or die-punching operations for the purpose of initiating the manufacture of tile or other objects provided with planar surfaces. In FIG. 1 the combined strips are shown being fed to a die-punching machine 18 from which the cutout tile units may be discharged onto a continuous conveyor and fed into a kiln wherein they may be burned to a temperature and for a sufficient length of time to mature both the body and the glaze.

Figure 3:
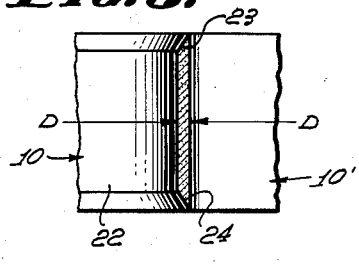
FIG. 3 is an enlarged plan view of a pair of cooperating rollers adapted for use in the arrangement illustrated in FIG. 1.

FIG. 3 illustrates one form of rolls which have been used. In order to prevent the development of cracks and variations in the continuous formed ribbon, it has been found desirable to subject the composition to lateral and transverse compression. As previously indicated, the surfaces of the rolls move at substantially the same peripheral speed and in the same direction toward the gap. To prevent extrusion of the material from the edges and insure a comparable density throughout the ribbon, the surface 22 of the roll 10 may be provided with outwardly tapering edge areas 23 and 24, which tend to compress the composition laterally. The opposing roll is a similar cylinder without such outwardly directed edge areas.

The ceramic body composition deposited upon the forming rolls should be free-flowing and non-coherent and such characteristics may be imparted to the composition by fine grinding, control of particle size or screen analysis, pelletizing or granulation (as by the process of Patent No. 2,251,454), control of moisture content and other factors described hereafter in more detail. The ceramic body composition deposited upon the top surfaces of the rolls should feed by gravity. Pressure feeding of the ceramic body composition into the gap, as by augers, pistons, stamps or beaters is not desirable, since these expedients actually prevent the rolls from feeding themselves and cause stoppages and bridges on the feed side of the rolls and pockets and other evidences of non-homogeneity in the ribbon discharged from the rolls.

It is to be understood that the glaze composition need not be applied to the strip 14 in the form of a compressed leathery strip 15. Instead, the glaze composition, in the form of a slurry, may be spread upon the strip 14 by means of a doctor blade, or the glaze composition may be sprayed or dusted upon the strip 14. Any other form of decoration such as the application of glaze by the silk screen process or the application of underglaze decorations, over-glaze decals, and the like, may be had.

The body compositions adapted for use in the method herein disclosed may vary considerably in accordance with the thickness of ceramic unit being formed or manufactured, the use to which it is to be put and the method of decoration, if any, which is to be employed. In all instances, however, the ceramic body composition which is fed to the forming rolls, must be in a finely divided granular or comminuted, non-coherent, free-flowing form, capable of assuming a natural angle of repose. Blending devices, mullers and other mixing, grinding and comminuting equipment can be used in the preparation of the body composition but since mullers often produce compacted lumps, it is desirable to employ a hammer mill or equivalent device immediately prior to the feeding of the body composition to the forming and compacting rolls. This last comminuting step should not, however, aerate the material excessively since the presence of large amounts of entrained or adsorbed air appears to be detrimental to the density and coherence of the ribbon of material formed therefrom.

The particle size or screen analysis of the body composition supplied to the compacting rolls should preferably be such that a major portion of the composition is composed of particles falling within the range of 1D to 6 or 7D (D being a unit of particle size) such major portion being relatively evenly distributed within such range. The material should not contain an excessive amount of extremely fine particles (smaller than 1D) nor of coarse particles (larger than 8D). The size of the largest desirable particles (6 or 7D) contained in a body composition depends somewhat upon the thickness of the coherent ribbon being formed by the compacting rolls, the average particle size of ceramic compositions used in making very thin tile of say 0.080 inch in thickness, being materially smaller than the average size of particles employed in making a ceramic veneer 0.4 or 0.6 inch in thickness. In either case, excessive amounts of fines appear to impair the green strength of the formed ribbon. In making thin ribbons less than 0.1 inch in thickness, preferably all of the comminuted body should pass a 12 mesh sieve (although 2% to 3% of 8 mesh material may be tolerated), the major portion of the comminuted ceramic body composition passing a 20 mesh and being retained on a 100 mesh sieve; between 30 and 45% may be finer than 100 mesh. When ceramic veneer ribbons of say 0.4 inch to 0.6 inch in thickness are being made, and the body composition contains sand, grog and clay, 2% to 5% of the composition may even remain on a 4 mesh sieve, the larger portion of the material passing an 8 or 10 mesh and being retained on a 60 mesh sieve, with 30% to 45% passing a 60 mesh sieve.

The body composition employed may be pelletized but when this method of preparation is employed the particle size should again vary so as to produce a graded aggregate on a small scale, with some fines present. Unless a percentage of very fine particles is present in the body the pelletized composition will produce a ribbon which does not have a completely uniform surface appearance nor a surface which is as smooth as that obtained with a body composition containing 25% to 40% of very fine particles.

The body composition may also vary appreciably in constituents. The following examples illustrate the wide range of body compositions which may be successfully manipulated in the manner stated. Units or objects having planar surfaces can be made from bodies composed of from 25% to 45% of clay, 9% to 40% of fusible matrix material such as ground glass, volcanic glass or highly alkaline materials of ceramic properties: 0% to 75% of raw, unburned talc, and/or 0% to 65% of calcined talc or talc bisque or inert material. An exemplary body within this group may contain 37% clay, 16% ground glass, 10% raw talic and 37% talc bisque. Objects can also be made by the methods of this invention from bodies of a sewer piper or terra cotta composition type, for example, one composed of clay and grog, such as one containing 33% filler clay, 10% low grade refractory clay, 15% plastic red burning clay, 32% semiplastic red burning clay and 10% grog. Another composition may comprise 50% of clay, 15% sand and 35% grog. China bodies can also be used such as one composed of 15% ball clay, 30% kaolin, 35% of nepheline syenite and 20% silica.

In order that the formed ribbon exhibit additional green strength, it is desirable to use some clay and in some instances even an organic or resin material. The use of organic materials such as gums or those which readily disassociate, generate gases and carbonize during burning, is not recommended when a white product is desired or when the finished product is to be glazed, but certain synthetic resins such as the methacrylates, styrene types, polyvinyl types and thermoplastics can be used in the form of aqueous emulsions or dispersions in compounding the body. The amount of such organic solids may be from 0.2% to 5% by weight of total body composition. Usually the use of finely divided clay or talc in the body composition imparts the desired plasticity and coherence, but when a short porcelain or barium titanate body is used, organic constituents appear helpful.

The body compositions supplied to the forming rolls are relatively dry, free-flowing granular or comminuted materials. This material or composition is subjected to extremely high pressure within the gap between the rolls. The material may be said to exhibit a certain amount of plastic flow under such high pressure but such plasticity is not solely dependent upon the presence of moisture and at no time should the ceramic composition contain enough moisture to impair its granular, non-coherent free-flowing characteristics or cause sticking of the body to the rolls. The presence of finely divided particles (some of which pass a 150 or even a 200 mesh sieve) appear to facilitate the formation of a coherent and dense, ribbon-like product.

In order to effectively use the novel method of operation and produce a coherent and dense, ribbon-like product, it has ben found that the moisture content of the granular or powdered composition should be maintained within relatively narrow limits. Ordinarily the moisture content should be kept between about 7% and 13%, particularly when very thin ribbons are being made from bodies low in clay. When thicker ribbons (in excess of 0.2 inch in thickness) are being made from terra cotta or bodies containing 45%–55% of clay, the moisture content may range from 12% to 18% without impairing the free-flowing, non-sticking characteristics.

It may be noted that in actual operation it has been found that the length of the ribbon formed by the rolls exceeds the perimeter of the roll. The reasons for this unusual result are not clearly understood but the fact remains that for every revolution of the rolls a ribbon-like strip of material exceeding the perimeter or circumference of the rolls is obtained, particularly at the beginning of a run.

The dense, compacted and coherent ribbon-like ceramic product obtained from the forming rolls has numerous desirable characteristics, among them being a materially reduced total shrinkage. A given body, when formed into objects by normal plastic processes (moisture content 20%–24%), may exhibit a shrinkage of 8% (during drying and burning); the same body converted into a ribbon by the method of this invention will exhibit a total shrinkage of between 3% and 3½%. Moreover, the green ribbon will exhibit high green-strength. These characteristics permit the ribbon to be readily handled during drying and burning and the production of units such as tile or panels having dimentional stability and uniformity. It is to be remembered that tile must conform to very strict size limitations, a 6 in. commercial tile not deviating from its predetermined or desired size by more than 0.005 inch.

The handling of a long, continuous ribbon or strip of the densely compacted body composition during subsequent steps will vary with the type of product being manufactured, and since the product may be in the form of large panels, relatively small tile, it may be provided with a glazed or decorated surface, it may be left in bisque form, etc. In all instances, the continuous ribbon of ceramic composition, compacted in the manner stated, will have to be cut or trimmed to desired size. It has been found desirable to cut or score the freshly compacted ribbon, then subject it to drying and burning (or dry and semimature the ribbon by subjecting it to a temperature sufficiently high to remove not only free moisture but also some of the combined moisture) and then break or separate the desired pieces from the ribbon before subjecting them to glazing operations.

The coherent, ribbon-like, continuous strip discharged from the gap between the rolls, can be moved along a horizontal plane for a distance of 20 to 30 feet without the use of belts, conveyors or externally applied conveying forces and without deformation or buckling of such strip. This phenomenon vividly illustrates the tremendous pressure to which the composition is subjected between the roll surfaces and the coherence, strength and density of the ribbon. The forwardly directed force components in the strip discharged from the gap can be, and in large part are, utilized in causing the strip to move past scoring devices and through a heating zone.

Figure 4:
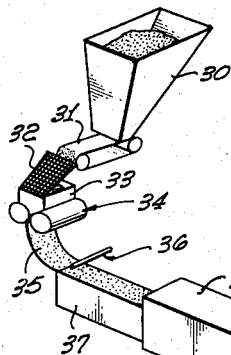
FIG. 4 is a perspective view of a modified arrangement of units and stages which may be employed in the practice of the invention.
Figure 4:
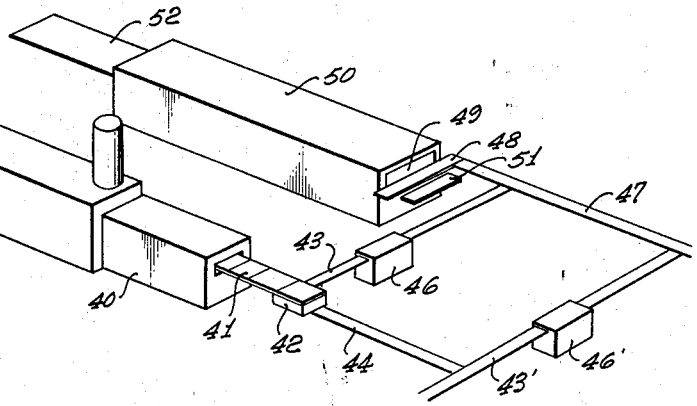

A more complete arrangement of equipment is illustrated in FIG. 4 in somewhat diagrammatic manner. As there shown, the free-flowing ceramic composition, after having been suitably blended, may be discharged into a bin 30 and fed therefrom in any suitable manner as by means of a feeder 31 through a vibrating screen 32 into the hopper 33 immediately above the forming rolls generally indicated at 34. The ribbon of material 35 discharged from the rolls, may be first subjected to a partial transverse scoring by a scoring unit indicated at 36 and then scored or cut longitudinally at 37 in the event it is desired to make objects which are narrower than the ribbon 35. The scored and longitudinally cut ribbon may then pass through a drying unit 38, a bisque kiln 39 and a cooling lehr 40, the material being then discharged at 41 into operative engagement with a breaker or separating unit 42, wherein the long ribbons are separated into tile units along lateral score lines formed by unit 36. Suitable conveyor belts such as 43 and 44 may lead from the breaker unit so as to permit the individual pieces of bisque to go through glaze-applying stations indicated at 46 and 46′. It will be noted that conveyors 43 and 43′ are in parallel, thereby permitting the output of the bisque kiln to be sent either through one or the other or both of the glaze-applying stations. The conveyors 43 and 43′ may discharge the tile units to which the glaze composition has been applied upon a conveyor 47 leading to an intermittently driven accumulator 48, upon which a relatively large number (say 6 to 18) of the individual tile units may be aligned. Periodically this alignment of tile units is moved from the accumulator 48 onto a continuous conveyor 49 extending through the glost kiln 50 by means of a pusher 51. The tile units discharged from the glost kiln 50 as at 52 may be sent to suitable inspection assembly and packaging stations. This compact arrangement permits the use of a relatively narrow bisque kiln operating on a short cycle and a wider glost kiln operating on a longer cycle.

FIGS. 5 and 6 are enlarged views in plan and vertical section, respectively, of the forming roll arrangement and an arrangement of scoring devices. It will be noted that the forming roll unit 34 differs from that illustrated in FIG. 3 in that the forming roll 64 is provided with a flange 65 which closes the ends of the gap between rolls 64 and 64' and is in sliding contact with the end surface of roll 64'. It is also to be noted that the feeding hopper 33 has one edge resting upon the edge of flange 65 and extends along the ends of roll 64'. FIG. 5 also illustrates a motor-gearbox-worm drive for the rolls and means for controllably adjusting roll 64' toward and away from roll 64 to permit variation in the gap.

It has been discovered that a relationship exists between the diameter of the rolls and the thickness of the compacted ribbon most effectively formed thereby. The mechanical efficiency of the equipment and the characteristics of the formed ribbon are at their optimum when the following relationship exists:

$$\frac{R}{R+T}=0.950 \text{ to } 0.980$$

wherein R is the radius of the roll and T is the gap between the rolls in inches. Generally expressed, thicker ribbons require the use of rolls of larger diameter. When excessively large diameter rolls are used in making a thin ribbon, excessive power consumption results.

It has been further discovered that in order to insure uniform density from one longitudinal edge to the other of the formed ribbon, the height of the flange (indicated by "F" in FIG. 6) should be between 1.5 and 4 times the gap between the rolls.

The compacted ribbon discharged from the gap may be directed by means of a curved guide 67 into a horizontal plane and into operative engagement with lateral scoring units 36 and longitudinal scoring or cutting unit 37. The curved guide 67 may be adjustable as at 68 and is preferably perforated or slotted so as to prevent the formed ribbon from adhering thereto. In most instances, the formed ribbon must be scored transversely at uniform distances so as to facilitate subsequent separation of the ribbon into panels, tiles or units of exactly the same predetermined size. The lateral scoring device is actuated in timed relation to the movement of the formed ribbon 35. For purposes of illustration, the lateral scoring unit may comprise two freely journaled rollers 70 each provided with a thin upstanding circumferential cutter 71, one of such rollers being positioned above the ribbon 35 and the other therebelow, the two scoring rollers being simultaneously moved in any suitable manner (as for example by electrical and hydraulic means), across the entire ribbon 35 and along a path at an angle to the axis of the ribbon, as indicated by the dash arrow 72. The ribbon 35 may be supported at either side of such path of travel by supporting plates 73 and 74. Periodic actuation of the transverse scoring device 36 may be controlled by means of a circuit closed periodically by means of a traction wheel 75 rotated by the movement of the ribbon 35 against which 75 is yieldably urged, the traction wheel 75 being provided with a stepped cam adapted to close the circuit 76 once every revolution of the wheel 75. Upward movement of ribbon 35 may be prevented by means of a roll or wheel 77.

The speed of the cutter 36 in its movement across the ribbon 35 depends upon the speed at which the ribbon 35 is moving. Although the path of travel is at an angle as indicated by arrow 72, the resulting score lines are at right angles to the longitudinal axis of the ribbon 35. It may be noted at this time that the method of the present invention permits the formation of a ribbon 35 at a rate of from about one to twenty feet per minute.

It may be noted that the transverse score lines formed by scoring unit 36 extend only partially through the ribbon 35, ordinarily, approximately one-third of the total thickness of the ribbon 35 is left uncut.

The longitudinal scoring or cutting unit 37 may comprise freely rotatable rollers such as 81, 81' and the like, mounted upon a shaft 80, extending transversely above the ribbon 35, and another series of similar scoring rollers 83 and the like journaled upon a shaft 82 positioned below the ribbon 35. The number of scoring rollers employed and their spacing will vary with the size of the tile or panels being made. It is desirable, however, to trim off the outer edges of the ribbon 35, these edge strips 84 being removed by the scoring or cutting rollers 81 and removed by plow 85. Moreover, it may be noted that the cooperating upper and lower scoring units such as 81 and 83, may either score the ribbon 35 longitudinally or they may cut through the ribbon completely thereby forming two or more parallel ribbons moving into the drying unit 37.

After being scored, the ribbon 35 is preferably passed through the drier while supported upon an open mesh metal belt conveyor, heat being supplied to both the top and bottom surfaces of the ribbon. The dried ribbon can then be pushed through the bisque kiln 39 while being supported upon a series of refractory, spaced points or ribs. FIG. 7 illustrates one arrangement of refractory floor plate which can be used in a muffle type kiln for supporting the ribbon or ribbons and permitting such ribbons to move through the kiln. FIG. 7 illustrates a refractory plate 90 provided with a plurality of upstanding flat topped ribs 91, 92, 93 and the like, these ribs being preferably staggered and at angles to the longitudinal axis of the kiln and the direction of travel of ribbon, the tops of these ribs being ground to lie in a single plane. Such method of supporting the ribbon permits ready access of heat to the ribbon and has been found to permit very rapid burning to maturity without buckling or deformation.

The passage of the ribbon or ribbons through the lehr 40 may be facilitated by the use of an open mesh metallic, continuous conveyor, such lehr and conveyor permitting the temperature of the burned ribbon to drop to between to about 200° and 300° F. prior to its discharge into the breaker station 42.

FIG. 8 diagrammatically illustrates one form of automatic breaker. As there shown, the ribbon 35' provided with its transverse score lines 95 and 96, is constantly fed between freely journaled, closely spaced rollers 97 and 98. Mounted for free rotation in the line of travel of the ribbon 35', and above the transverse conveyor 43, is a breaking roller 99 with its axis of rotation above the plane of ribbon 35', such breaking roller extending below the plane of such ribbon. As ribbon 35' advances, its forward edge will contact breaking roller 99 and be deflected downwardly. Roller 99 is so spaced with respect to rollers 97 and 98 that the first score line 95 is between the breaking roller and rolls 97 and 98 and adjacent the latter. Downward deflection of the end of the ribbon therefore, causes the ribbon to break at score line 95, the separated tile unit being deposited upon conveyor 43.

It may be noted at this time that by scoring transversely and then removing the longitudinal edge portions 84, very sharp, clean-cut corners and edges are imparted to the tile units. Furthermore, by first subjecting the tile units to a bisque burn and then breaking them into individual units and finally applying a glaze, all edges of the tile units are maintained uniform and the glaze properly covers such edges. Separation of a long ribbon on which the glaze has been matured prior to such separation into units, is not conducive to the production of tile having smooth uniform edges.

When the products made in accordance with the present invention are in the form of thin tile, such tile need not be cemented into position on a wall in the form of separate and discrete units as is customary. Instead, these thin tile units may be affixed to a foraminous carrier sheet in suitably spaced and aligned relation so that the entire carrier sheet, with 6, 12, 24, or any other desired number of tile attached thereto, can be affixed to a wall at one time, thereby not only shortening the time necessary to cover a given area of wall, but at the same time facilitating the operation greatly in that the tile would be in perfect vertical and horizontal alignment. A suitable carrier sheet may comprise a coarsely woven, open-mesh fabric made of cut, synthetic, mono-filaments, jute or even metal wires, with openings between the threads of a size sufficient to permit the mastic or other cement employed on the wall to penetrate the fabric and bond directly with the rear surfaces of the tile element. A fabric of the desired character may be first coated and impregnated with a thermoplastic adhesive or resin and before such adhesive or resin has set, the thin ceramic tile may be properly arranged upon the surface of the fabric (or vice versa) with uniform or grout spacing between such tile. Instead of dipping or impregnating the fabric with a thermoplastic adhesive, the rear face of the tile may be sprayed with such adhesive and the fabric then applied to a multiplicity of tile with their edges in proper spaced relation. At all events, the resulting product for use by the ultimate consumer consists of a carrier sheet carrying on one face a large number of thin ceramic plates or tile. The carrier sheet may be slightly smaller than the total area of the tile units carried thereby or may extend beyond the margins of the tile along one or two sides of the assembly. The carrier sheet need not be continuous; strips of open-mesh fabric may be used to hold adjacent rows of tile together. It will be understood that the application of the tile to the fabric, or vice versa, is preferably carried out by the aid of mechanical devices and fixtures so as to insure uniform alignment and spacing between the tile. After a panel of such tile elements has been affixed to a wall by means of a suitable adhesive, mastic, or cement, the spaces between the tile may be filled with a suitably colored grout.

Attention is called to the fact that a continuous ribbon-like strip of ceramic glaze composition (such as has been identified at 15) is per se a novel article of manufacture having highly desirable characteristics. Such strips of glaze-forming composition may be used as a stock from which letters, numerals, standard, geometric, decorative figures, etc. may be die-punched, such die-punched articles being then applied to the surface of tile, brick panels or other ceramic objects as occasion warrants. These previously dried strips of glaze forming composition need only be moistened as with a wet sponge in order to reinvest such strip with sufficient leathery characteristics to permit die-punching or cutting into desired shape without shattering. When glaze forming compositions are used in this manner it is desirable to include therein certain organic binders. The organic binder may be introduced in the form of an aqueous emulsion and thereby introduce a portion at least of the necessary water. Emulsions of various microcrystalline waxes, paraffin, stearic acid, thermoplastics and gums may be used in quantities sufficient to incorporate from 1% to as high as 10% of organic binder by weight of the total mixture.

Thin ceramic body composition strips can also be kept in a humid atmosphere for protracted periods of time and then die-punched into decorative rosettes, buttons, etc. for attachment to larger pieces (which are then glazed and fired) or punched into tile, insulating wafers, ceramic printed electric circuit bases, etc.

I claim:
1. In a method of continuously forming a strip of compacted, coherent, homogeneous and dense ceramic body composition, said strip having smooth, calendered surfaces and a moisture content of between about seven per cent and seventeen percent, the steps of: continuously depositing a free-flowing ceramic body composition by gravity into a zone between a pair of converging cylindrical surfaces of equal radius moving concurrently downward toward a gap; continuously removing a continuous, dense, compacted and flexible strip of ceramic body from said gap; and controlling the density and thickness of the strip in accordance with the relation

$$\frac{R}{R+T}=0.950$$

to 0.98, wherein R is the radius of each of the cylindrical surfaces and T is the thickness of the strip.

2. In a method of the character stated in claim 1, the step of: forming a continuous strip of compacted ceramic body composition which is of virtually uniform density throughout its width and inhibiting formation of spongy and cracked longtudinal edge portions in said strip which comprises restraining lateral movement of the free-flowing ceramic body composition being fed into said zone and simultaneously moving said free-flowing composition toward the gap and adjacent its ends at a greater speed than the speed at which the composition is moving toward the gap adjacent the cylindrical surfaces intermediate the ends.

3. A method of directly converting comminuted relatively dry, free-flowing and uncompacted ceramic body composition into dense and coherent continuous strips provided with planar surfaces, which comprises: comminuting and blending ceramic body composition ingredients to form a finely divided free-flowing ceramic body composition containing between about 7% and 13% of water, the major portion of such composition passing a 20 mesh sieve and being retained on 100 mesh sieve; continuously depositing such comminuted body composition by gravity in uncompacted form into a zone between a pair of converging cylindrical surfaces of equal radius moving concurrently downward at the same speed toward a gap and continuously discharging a continuous, dense, compacted and flexible strip of ceramic body from said gap, said compacted strip having a density and a strength sufficient to be moved by said cylindrical surfaces away from said gap without the use of other externally applied conveying forces and without deformation or buckling of said strip, and controlling the thickness of the strip in accordance with the relation $$\frac{R}{R+T}=0.95 \text{ to } 0.98$$

wherein R is the radius of each of the cylindrical surfaces and T is the thickness of the strip in inches.

4. A method of continuously converting an uncompacted, free-flowing, finely divided ceramic composition into a continuous, homogeneously dense and coherent thin strip having planar surfaces comprising: positively moving a pair of hard, cylindrical convex surfaces at the same linear speed downwardly toward a gap therebetween; depositing by gravity into a zone between the pair of cylindrical surfaces a comminuted, free-flowing ceramic composition, said ceramic composition containing not less than 30% of particles passing a 60-mesh sieve; continuously discharging a continuous, dense, compacted and coherent strip of desired thickness from said gap; and controlling the density and thickness of said strip in accordance with the relation $$\frac{R}{R+T}=0.950$$

to 0.980, wherein T is the desired thickness of the strip and R is the radius of each of the cylindrical surfaces.

5. A method of continuously converting an uncompacted, free-flowing, finely divided ceramic composition into a continuous, homogeneously dense and coherent thin strip having planar surfaces comprising: positively moving a pair of hard, cylindrical convex surfaces at the same linear speed downwardly toward a gap therebetween; depositing by gravity into a zone between the pair of cylindrical surfaces a comminuted, free-flowing ceramic composition, said ceramic composition containing not less than 30% of particles passing a 60-mesh sieve and from about 0.2% to 5% by weight of an organic binder; continuously discharging a continuous, dense, compacted and coherent strip of desired thickness from said gap; and controlling the density and thickness of said strip in accordance with the relation $$\frac{R}{R+T} = 0.950 \text{ to } 0.980$$

wherein T is the desired thickness of the strip and R is the radius of each of the cylindrical surfaces.

6. A method of continuously converting an uncompacted, free-flowing finely divided ceramic composition into a continuous, homogeneously dense and coherent thin strip having planar surfaces comprising: positively moving a pair of hard, cylindrical convex surfaces at the same linear speed downwardly toward a gap therebetween; depositing by gravity into a zone between the pair of cylindrical surfaces a comminuted, free-flowing ceramic composition, said ceramic composition containing not less than 30% of particles passing a 60-mesh sieve; continuously discharging a continuous, dense, compacted and coherent strip of desired thickness from said gap; and controlling the density and thickness of said strip in accordance with the relation $$\frac{R}{R+T} = 0.950 \text{ to } 0.980$$

wherein T is the desired thickness of the strip and R is the radius of each of the cylindrical surfaces, said compacted strip having a density and strength sufficient to be moved by said cylindrical surfaces away from said gap without the use of other externally applied conveying forces and without deformation or buckling of such strip.

References Cited in the file of this patent

UNITED STATES PATENTS

| | | |
|---|---|---|
| 204,957 | Durand | June 18, 1878 |
| 778,715 | Seeser | Dec. 27, 1904 |
| 854,823 | Hedrich | May 28, 1907 |
| 1,342,192 | Trevillian | June 1, 1920 |
| 1,369,752 | Luce | Feb. 22, 1921 |
| 1,534,768 | Brown | Apr. 21, 1925 |
| 1,643,059 | De Both | Sept. 20, 1927 |
| 1,819,686 | Malinovszky | Aug. 18, 1931 |
| 1,941,403 | Lansing et al. | Dec. 26, 1933 |
| 1,980,270 | Harkot | Nov. 13, 1934 |
| 2,230,309 | Reed | Feb. 4, 1941 |
| 2,371,353 | Parsons | Mar. 13, 1945 |
| 2,425,626 | Light | Aug. 12 1947 |
| 2,552,553 | Heine | May 15, 1951 |
| 2,552,937 | Cohen | May 15, 1951 |
| 2,601,105 | Dunmire | June 17, 1952 |
| 2,601,712 | Keys | July 1, 1952 |
| 2,714,239 | Minnium | Aug. 2, 1955 |
| 2,756,459 | Kellner | July 31, 1956 |
| 2,758,336 | Fransen | Aug. 14, 1956 |

FOREIGN PATENTS

| | | |
|---|---|---|
| 400,535 | Great Britain | Oct. 26, 1933 |
| 512,547 | Great Britain | Sept. 19, 1939 |